(12) United States Patent
Krautschick et al.

(10) Patent No.: US 9,188,287 B2
(45) Date of Patent: Nov. 17, 2015

(54) PRODUCT FOR FLUIDIC APPLICATIONS, METHOD FOR ITS PRODUCTION AND USE OF SUCH A PRODUCT

(75) Inventors: Hans-Joachim Krautschick, Solingen (DE); Joachim Hulstrung, Dusseldorf (DE)

(73) Assignees: ThyssenKrupp Steel Europe AG, Duisburg (DE); ThyssenKrupp Nirosta GmbH, Krefeld (DE)

( * ) Notice: Subject to any disclaimer, the term of this patent is extended or adjusted under 35 U.S.C. 154(b) by 270 days.

(21) Appl. No.: 13/578,120

(22) PCT Filed: Feb. 2, 2011

(86) PCT No.: PCT/EP2011/051488
§ 371 (c)(1),
(2), (4) Date: Oct. 18, 2012

(87) PCT Pub. No.: WO2011/098383
PCT Pub. Date: Aug. 18, 2011

(65) Prior Publication Data
US 2013/0125992 A1 May 23, 2013

(30) Foreign Application Priority Data
Feb. 10, 2010 (DE) .......... 10 2010 007 570

(51) Int. Cl.
F15D 1/06 (2006.01)
F17D 1/08 (2006.01)
F15D 1/00 (2006.01)

(52) U.S. Cl.
CPC *F17D 1/08* (2013.01); *F15D 1/004* (2013.01); *F15D 1/065* (2013.01); *Y10T 137/0318* (2015.04); *Y10T 137/8593* (2015.04)

(58) Field of Classification Search
CPC ....... F15D 1/003; F15D 1/0035; F15D 1/004; F15D 1/06
USPC ........................................ 138/38, 39
See application file for complete search history.

(56) References Cited

U.S. PATENT DOCUMENTS 2,389,166 A * 11/1945 Seaver ............................ 165/9.1
4,314,587 A * 2/1982 Hackett ........................... 138/38
4,733,698 A * 3/1988 Sato ................................ 138/38
(Continued)

FOREIGN PATENT DOCUMENTS

DE 3609541 A1 9/1987
DE 20114878 U1 5/2002
(Continued)

*Primary Examiner* — James Hook
(74) *Attorney, Agent, or Firm* — The Webb Law Firm (57) ABSTRACT

The present invention relates to a product for fluidic applications, with at least one surface segment having a plurality of ribs in contact with a fluid flowing in a flow direction and adjacent ribs delimit between them in each case a valley and a method for production and a use of such a product. The product according to the invention can be produced economically with further improved flow properties; in that at least two ribs with the valley they respectively delimit are combined in a group, that at least two groups are present, and separated from each group arranged adjacent to it, viewed transverse to the flow direction S of the fluid, by a valley, and that the height profile of the valley differs in each case from the height profile of the valleys delimited by those ribs of the groups which are adjacent to the valley separating the groups.

12 Claims, 8 Drawing Sheets

(56) References Cited

U.S. PATENT DOCUMENTS

| | | | |
|---|---|---|---|
| 4,750,693 A * | 6/1988 | Lobert et al. | 244/200 |
| 4,863,121 A | 9/1989 | Savill | |
| 4,865,271 A | 9/1989 | Savill | |
| 4,907,765 A * | 3/1990 | Hirschel et al. | 244/200 |
| 4,930,729 A * | 6/1990 | Savill | 244/200 |
| 5,026,232 A | 6/1991 | Savill | |
| 5,692,560 A * | 12/1997 | Messant et al. | 165/151 |
| 5,704,424 A * | 1/1998 | Kohno et al. | 165/184 |
| 6,173,762 B1 * | 1/2001 | Ishida et al. | 165/133 |
| 6,655,451 B2 * | 12/2003 | Tada et al. | 165/179 |
| 7,048,043 B2 * | 5/2006 | Leterrible et al. | 165/184 |
| 2004/0155150 A1 | 8/2004 | Krohmer et al. | |
| 2004/0230264 A1 * | 11/2004 | Dobak et al. | 607/105 |
| 2007/0031639 A1 | 2/2007 | Hsu et al. | |
| 2009/0158799 A1 | 6/2009 | Takeishi et al. | |

FOREIGN PATENT DOCUMENTS

| | | |
|---|---|---|
| DE | 10130392 A1 | 1/2003 |
| EP | 0216384 A2 | 4/1987 |
| EP | 0284187 A1 | 9/1988 |
| EP | 1857722 A1 | 11/2007 |
| EP | 1925779 A1 | 5/2008 |
| JP | 2000087921 A | 3/2000 |
| JP | 2005522644 A | 7/2005 |
| JP | 201007846 A | 1/2010 |
| WO | 2008036074 A2 | 3/2008 |

* cited by examiner

PRODUCT FOR FLUIDIC APPLICATIONS, METHOD FOR ITS PRODUCTION AND USE OF SUCH A PRODUCT

BACKGROUND OF THE INVENTION

1. Field of the Invention

The invention relates to a product for fluidic applications with at least one surface segment provided to come into contact with the fluid flowing in a flow direction, wherein in the segment coming into contact with fluid are formed ribs of particular length and shape, of which adjacent ribs delimit between them in each case a valley. The invention also relates to a method for production and use of such a product.

2. Description of Related Art

Products of the type cited above are for example sheets or pipes or other flow bodies made therefrom, through or over which a flowable medium flows in practical use. Such products are used for example in the production of heat exchangers for solar thermal plants, as suction pipes for suction devices used in domestic or industrial apparatus, or other applications. With a view to an optimum energy use, in these and comparable fluidic applications one essential construction objective is to reduce flow losses to a minimum.

The fluid flowing over the products according to the invention can be a liquid such as water, oil, a suspension or dispension, a gas or gas mixture such as for example air, oxygen, nitrogen, argon or similar. The fluid can be mixtures of the same phases and also multiphase media such as gas-liquid or particle-fluid mixtures or particle-gas flows. Individual phase parts can have concentration differences. Also a substance exchange can occur within a phase or between the phases of the flowing fluid.

The processes used for the production of pipes, sheets and sheet films, and films in general, vary greatly. Sheets, sheet films and films made from steel or light metal materials are normally hot- or cold-rolled in the production process. Where they consist of corrosion-sensitive materials, they are normally also coated. Sheets made of non-corrosion resistant steels are normally coated with zinc, tin, zinc-magnesium. In addition or alternatively a paint layer can be applied.

In the production of pipes suitable for fluidic applications from sheet metal, the sheets are normally formed into a slot profile. The resulting slot is then closed by a welding process. Alternatively pipes can be made seamlessly from round castings.

A common feature of all known processes for production of components intended for fluidic application is that the surface structure of the products generated according to the current prior art have the following features:

The surface structure is stochastic in nature and described only imprecisely. To describe the surface topography and roughness, statistical mean values are used such as for example the arithmetic mean roughness Ra, the maximum roughness depth Ry, the mean roughness depth Rz etc.

In the production of sheets, the topology or roughness of a sheet can be influenced by texturing the working rolls used for hot or cold rolling of the sheet. Thus by corresponding roll texturing, the key values listed above can be influenced and thereby the visual impression of the surface, the paintability or deformation behaviour in subsequent moulding steps such as deep drawing and pressing. The surface structure which can be generated in this way however remains substantially stochastic in nature.

To describe the central properties here essential for the fluidic behaviour of product surfaces, normally specific key values are used such as sand roughness, coefficient of friction X, resistance count and similar empirically determined key values to describe the friction and the pressure loss occurring at the surface under the flow in each case. The key values concerned are influenced firstly by the nature of flow (laminar, turbulent) and secondly by the material and process used in production of the product coming into contact with the flowing fluid in each case. Thus for a steel pipe with longitudinal seam welding, new roller skin, the value for the equivalent sand roughness k lies typically in the range 0.04 to 0.1 mm (stochastic).

With a view to the efficient use of resources and environmentally and climate-friendly use of energy—here electricity, pump power, fuels and similar—minimising flow losses in components through or around which fluid flows has particular importance. The energy required to deliver a fluid through a pipe or around a body depends on the friction losses which are generated in the fluid by the segment of the respective component exposed to fluid contact i.e. the inner surface of the pipe through which fluid flows or the respective wall of the body around which it flows. For a relative movement of component and fluid, at least the friction predominating between them must be overcome.

In the case of a fluid-carrying pipe, one factor is the pressure loss Dp which results when a fluid flows at speed v through the pipe. In the case of fluid flowing around the body, often the coefficient of friction cw is used as the comparative energy value.

Friction losses in components through or around which fluid flows arise in principle because in the contact zone, the relative speed between the fluid and the segment of the component it moistens is equal to zero. Between the fluid speed at the respective segment of the component and the flow further out, consequently in the case of a pipe flow, a speed profile forms ranging between zero at the pipe inner wall and a maximum speed in the centre of the pipe. In the case of fluid flowing around a body, a corresponding speed profile results which ranges from "zero speed" at the respective component to a maximum flow speed in the outer region lying spaced from the respective component and beyond influence.

In the region of contact between the flowing fluid and the component, characteristic flow regions are formed known as interface layers which decisively determine both the energy losses and the heat or substance transfer between the fluid and the wall/body. Depending on the observation site and the flow form (laminar or turbulent), laminar interface layers, transition regions and turbulence interface layers occur (both for the flow and for the temperature and substance concentration). Their spatial extent and the site of the change from laminar to turbulent can be determined as a function of the roughness k.

As stated initially, the roughness k is usually a stochastic value and is determined by the production process. When a sheet is produced by hot and cold rolling, the rolling parameters and surface roughness of the roll have a decisive influence on the roughness of the resulting sheet.

Another cause of friction losses or reduced heat transfer is deposits which result by particle or droplet transport from the flow region in contact with the moistened wall of the component. The deposit mechanism is determined firstly by chemical, metallurgical or thermodynamic regularities and secondly by the roughness of a surface.

Also the heat transport from a wall to the fluid flowing along it—either by cooling processes, heating processes or incident radiation—directly influences the fluid behaviour at the wall. Thus the heat exchange in particular influences the viscosity of the fluid concerned. As a result of the heat supplied or dissipated in the region of the contact surface, a viscosity gradient is formed between the regions close to the wall and the uninfluenced flow remote from the wall. In the case of a solar thermal or comparable application, the formation of this gradient has an influence on the entire heat transmission behaviour of the object concerned.

DE 36 09 541 A1 discloses that the flow resistance of a surface over which there is a turbulent fluid flow, such as for example an inner face of a pipe, can be reduced in that on the surface of the body concerned, ribs running in the flow direction of are formed which are separated from each other by sharp-edged ribs. The ribs are arranged in a plurality of staggered rib groups which each consist of a plurality of ribs arranged transverse or oblique to the flow direction next to each other and spaced apart. The ribs of rib groups successive in the flow direction of the fluid can be arranged offset to each other lateral to the flow direction. At the same time the ribs of the individual staggered rib groups have short extensions in the flow direction. Adjacent ribs arranged transverse to the flow direction delimit between them in each case a valley formed in the manner of fluting, the transition of which to the adjacent rib is rounded in a fluted manner. The staggered arrangement is regarded as decisive for the effect of said surface structuring. The targeted formation of short ribs arranged with the staggered offset can be particularly effective in minimising the flow resistance in the region close to the wall.

EP 1 925 779 A1 discloses in general that the flow resistance at surfaces over or around which fluid flows can be reduced, and in particular the efficiency of flow machines further increased, if the surface around or over which the fluid flows is given a surface structure creating a sharkskin effect. This is achieved by material removal, in particular by etching the surface, or by applying a coating forming the desired structure on the surface concerned.

SUMMARY OF THE INVENTION

In the context of the prior art explained above, the object of the invention is to provide a product which can be produced economically with further improved flow properties, a method for its production and a particularly advantageous use of such a product.

With regard to the method, the solution according to the invention to the task outlined above is that the surface structure created according to the invention is embossed in a moulding step in the respective segment of the product coming into contact with the fluid.

A product according to the invention can be used particularly advantageously for the production of pipes which carry a fluid. Because of their particular flow properties, pipes made of products according to the invention are suitable in particular for use in solar thermal plants such as heat exchangers and similar.

A product according to the invention is provided for practical use for fluidic applications in which at least one of its surface segments comes into contact with a fluid flowing in a flow direction. In accordance with the prior art cited above, in the segment coming into contact with the fluid, ribs of particular length and shape are formed, of which adjacent ribs delimit between them in each case a valley, wherein at least two ribs with the valley they respectively delimit are combined in a group and at least two of these groups are present.

Typically the product according to the invention is a sheet or foil material made of a metal material, in particular a steel with sufficiently high corrosion resistance, as used for the production of pipes or other flow bodies in which in practical use contact occurs with a fluid moved relative thereto.

According to the invention the surface of such product is structured such that:

each group is separated from each group arranged adjacent to it, viewed transverse to the flow direction of the fluid, by a valley, the height profile of the valley separating the respective groups from each other in each case differs in each case from the height profile of the valleys delimited by those ribs of the groups which at the same time are adjacent to the valley separating the groups from each other, and the end faces of the ribs against which fluid flows are chamfered or rounded.

In a product according to the invention, the ribs formed on this surface and the valleys lying between them are no longer of the same shape and placed in even arrangement, but formed such that by targeted grouping and positioning of ribs and valleys of different construction, a surface structure is created which firstly can be manufactured reproducibly and economically on a large scale and secondly is optimised with regard to minimising flow losses.

This optimisation is achieved in that with the grouping of ribs and valleys according to the invention with valleys lying between the groups having a different shape from their adjacent valleys of the groups, the occurrence of turbulence in the flow close to the surface is prevented particularly effectively. Surprisingly it has been found that the staggered ordering of the surface structure in the manner of the sharkskin effect deemed expedient in the prior art is not particularly effective, but a comparatively disordered arrangement of ribs and valleys with separate shaping of the ribs and valleys gives a particularly favourable flow behaviour.

A particular advantage of shaping the surface structure according to the invention is that the pattern provided according to the invention of the arrangement of groups formed of ribs and valleys, despite the different shaping of the valleys separating the groups, can be manufactured easily and reliably reproducibly by machine. If the product according to the invention is a metal sheet, the surface structure according to the invention can for example be easily embossed in the surface of the sheet in a rolling step by use of a roller fitted with a corresponding negative embossing.

With the invention therefore a product is available which, at least in the region in which it is exposed directly to a fluid flowing relative to it, has a surface optimised with regard to its flow resistance. Evidently the extent of the surface structured according to the invention is not necessarily restricted to the segment of the product coming into contact with the fluid. Rather the surface structure according to the invention can also extend over the entire surface of the product when for example this is suitable in relation to production engineering aspects.

Depending on the respective application, it may also be sensible if the product according to the invention, in the region of its surface coming into contact with the fluid, comprises segments in which groups of ribs and valleys are formed, and segments in which such groups are not present, which are therefore formed in particular flat or have a different structure. Thus it is conceivable on the surface of the product moistened by the fluid, to arrange alternately in succession segments provided with groups of ribs and valleys formed according to the invention and differently formed segments. Also in a segment formed flat, segments formed according to the invention with isolated groups of ribs and valleys can be arranged.

As a result of the surface structure formed according to the invention, in a component (pipe) through which fluid flows or at a body around or over which fluid flows, optimum conditions are created with regard to flow resistance. Thus the shaping according to the invention allows optimisation for example of the thickness of the flow interface layer, the thickness of the temperature interface layer, the position and extent of the transition region in which the wall flow changes from laminar to turbulent, the heat transmission behaviour between the fluid and wall segments against which the fluid flows, the substance transmission behaviour between the fluid and wall sections over which the fluid flows, the mixing processes of regions close to the wall with the undisturbed flow outside the region close to the wall, the particle or droplet behaviour in a flow in contact with a surface, the properties of the fluid in the region close to the wall and the friction losses.

The deviation of the height profile of a valley separating two adjacent groups from each other from the height profile of the adjacent valleys of the group can be achieved in the simplest manner in that the floor of the valley separating in each case groups arranged adjacent to each other is lower than the floor of the valleys of the groups adjacent to the valley separating them. Also a deviation of the height profile can consist in that the valley separating two groups has a concave curve while the adjacent valleys of the groups have convex curves, or vice versa. It is also conceivable that the valley separating two adjacent groups is provided with furrows or ribs while the adjacent valleys of the groups have a uniformly smooth surface or vice versa.

The effectiveness with which the occurrence of turbulence close to the surface can be suppressed can be further increased in that at least one rib of each group has a greater height than the other ribs of the group, i.e. at least two ribs of a group have different heights.

In relation to the floor of the valley which separates two groups adjacent to each other in each case viewed transverse to the flow direction, the height of the ribs in a product according to the invention is typically in the region of 10 to 2000 μm.

If, in a surface structure according to the invention, the groups formed of ribs and the valleys they delimit are arranged offset to each other viewed in the flow direction of the fluid, this contributes to avoiding the occurrence of a laminar flow close to the wall. In the case of such an arrangement of groups, a particularly intensive exchange of flow layers occurs whereby in particular the heat transmission between the surface segment over which the fluid flows and the fluid is positively influenced.

Another favourable effect on the flow behaviour and heat transmission can be achieved if groups lying behind each other viewed in the flow direction of the fluid or groups lying next to each other viewed transverse to flow direction of fluid are arranged at a distance from each other. The interface layer flows resulting where applicable in the region of the typically flat spacing areas then, after a length determined by the space, meet a group of ribs and valleys at which they change their form and direction with the consequence that an exchange of the different flow layers results. This effect is particularly intensive if the floor of the spacing area present between two groups arranged spaced from each other is lower than the floor of the valleys of the groups adjacent to the respective spacing area or if the groups arranged behind each other viewed in the flow direction of the fluid are positioned offset to each other transverse to the flow direction. The same purpose is achieved if at least two groups have a different spacing from one of groups adjacent to them.

As well as the macrostructuring according to the invention achieved by spaced arrangement of groups, a fine structuring of the surface, also positive in relation to the optimisation of flow behaviour, can be achieved in that each of the groups comprises at least two subgroups which each comprise at least two ribs and the valley delimited by these ribs, and are separated from each other by a separating valley viewed transverse to the flow direction of the fluid. Because the height profile of the valley separating the respective subgroups from each other differs in each case from the height profile of the valleys delimited by those ribs of the subgroups which at the same time are adjacent to the valley separating the subgroups from each other, the embossing of ribs and valleys favourable according to the invention in fluidic terms can also be used in the fine structure.

The surface structure according to the invention can be produced particularly simply in terms of production technology if the groups formed from the ribs with the valleys they delimit between them and their subgroups each cover a rectangular area. When the individual groups and their subgroups are impressed into the surface of the product by rolling or a comparable shaping process, it is favourable if the arrangement of the groups follows a specific repeating pattern. In the case that the groups comprise subgroups, these viewed from above can be arranged crosswise or such that the centre points of the area they each cover form the corner points of a triangle.

In order to avoid as far as possible the occurrence of turbulence in the region of the subgroups grouped together into a group, it can be suitable if at least two of the subgroups have height profiles differing from each other.

Typically the groups, insofar as they do not contain subgroups, or their subgroups, each cover an area of $10 \times 10$ μm$^2$ to $2000 \times 2000$ μm$^2$. If several subgroups are combined into a group, this group can cover a substantially larger area.

Typically therefore in a product according to the invention, in a segment which is exposed to a fluid flow in practical use, a surface structure is impressed which comprises a group with at least two ribs and a valley in between, wherein the length and breadth of the area covered by the group typically amounts to 10-2000 μm and at least one of the ribs is between 10 and 2000 μm high, wherein the ribs of the group are connected together by at least one valley and this valley comprises at least one region which is higher than the floor of the preferably structureless valley lying between two adjacent groups.

In order to prevent the occurrence of turbulence in the region of the end faces of the ribs against which fluid flows, the end faces concerned are chamfered or rounded according to the invention. With the same objective, the downstream side rib faces can be chamfered or rounded in order to avoid a flow breakaway there. It can also be favourable in fluidic terms if the side faces of the ribs viewed in the flow direction, starting from a comparatively wide end face contact surface, run towards each other or are tapered in the direction of the narrower downstream side end face of the ribs.

Typically the products according to the invention are flat steel products produced by rolling such as stainless steel strips or slit strips.

The invention is now described below in more detail with reference to a drawing showing an embodiment example.

BRIEF DESCRIPTION OF THE PREFERRED EMBODIMENTS

FIGS. 1a-1f show various possible cross-section shapes of ribs 1 embossed in a surface structure of a product P present for example in the form of a hot and cold rolled stainless steel sheet. The thickness a and height b of the ribs 1 each lie in the range 0 to 2000 μm while the angle γ1, γ2 enclosed between the flanks 2, 3 and the base surface 4 of the ribs 1 can amount to 0° to 125°. The angles γ1, γ2 can be equal or unequal.

Figure 1A:
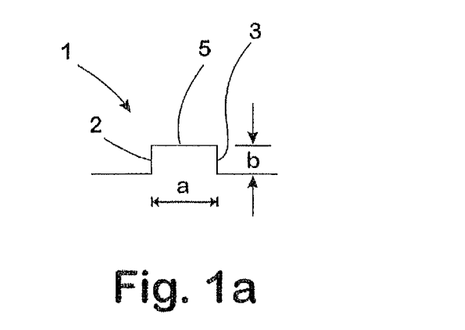
FIGS. 1a-1f various possible cross-section shapes of ribs formed in a surface structure according to the invention.
Figure 1B:
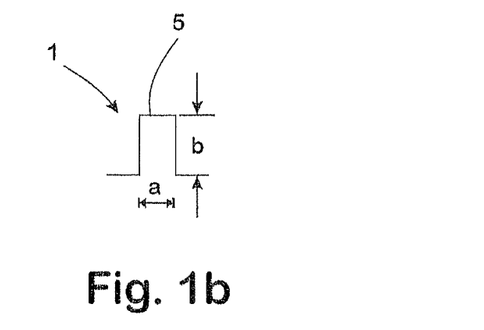
Figure 1C:
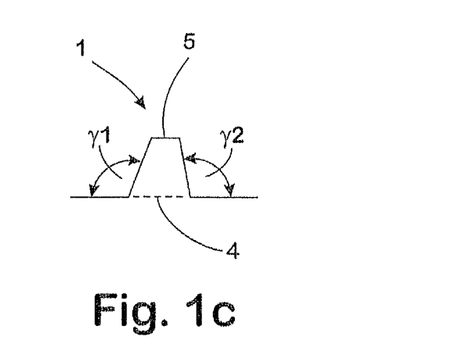
Figure 1D:
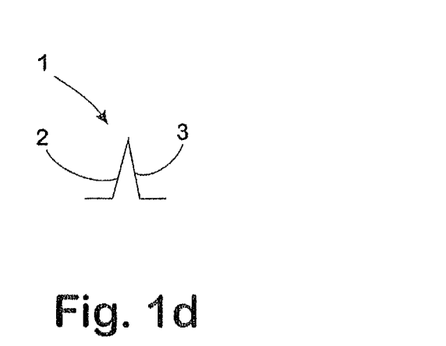
Figure 1E:
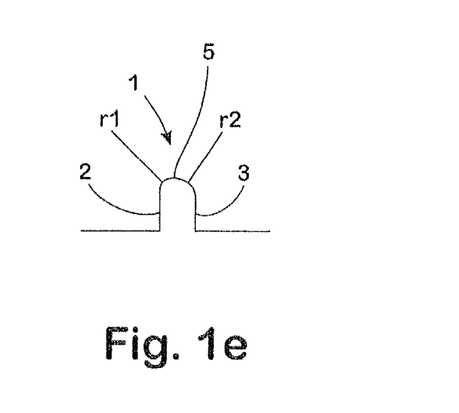
Figure 1F:
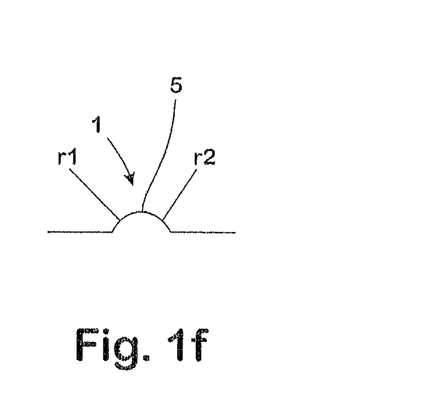

The roof surface 5 of the ribs can be flat (FIGS. 1a-1c) or curved concave (FIG. 1e) or convex. The transition radii r1, r2 to the flanks 3, 4 of the rib 1 lying in the range from 0 to 2000 μm can be formed equal or unequal. It is also conceivable to form the rib 1 with flanks 3, 4 running towards each other at the top with an acute angle so as to produce a triangular cross-section form (FIG. 1d), or use a rib 1 which has no pronounced flanks but merely a concave curved roof surface 5 (FIG. 1f).

The cross-section profiles can increase or decrease gradually (linear or non-linear) in thickness a, height b, angles γ1, γ2 and radii r1, r2, in order thus to achieve a profile change in the flow direction S.

In the flow direction S the ribs 1 can have a straight course or a curve or multiple curves. It is also conceivable to change the cross-section form of the ribs 1 once or more than once in the flow direction S.

Figure 2A:
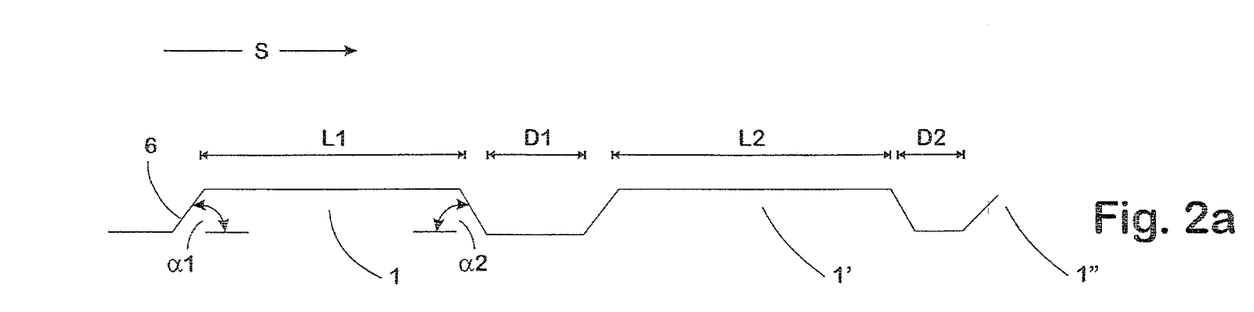
FIGS. 2a-2d various possible shapes of ribs formed in a surface structure according to the invention in side view.
Figures 2B, 2C:
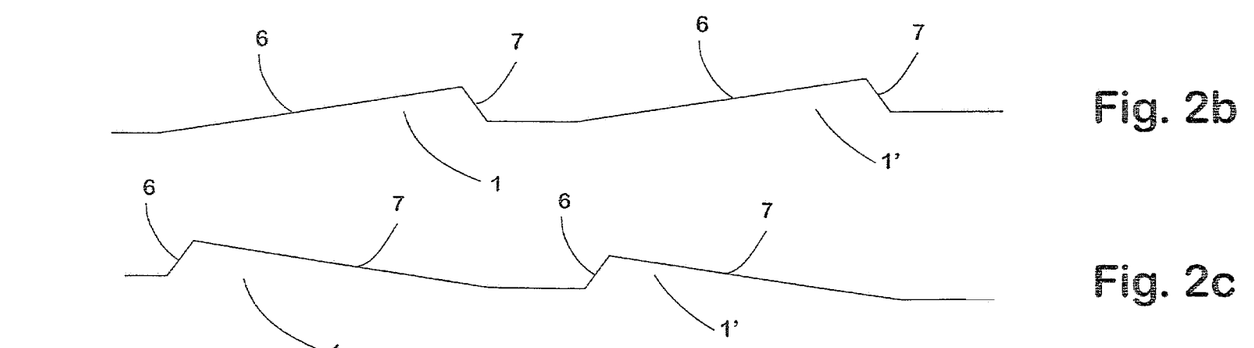
Figure 2D:
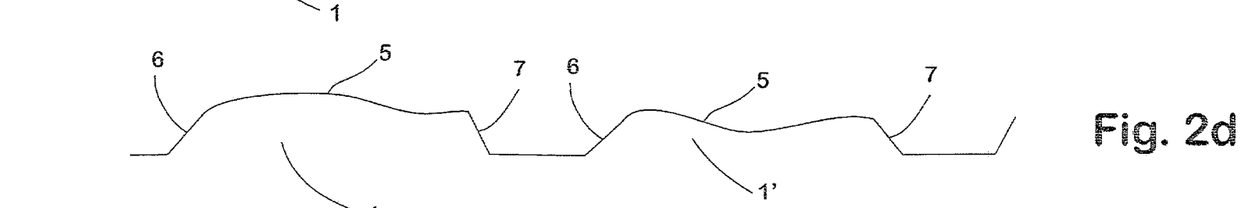

Ribs 1, 1', 1" arranged behind each other in the flow direction can, as shown in FIGS. 2a-2d, have different lengths L1, L2 in the flow direction S of the respective fluid, different height courses of their roof surfaces 5, and end face contact surfaces 6 and downstream surfaces chamfered at different angles α1, α2. The distances D1, D2 between successive ribs 1, 1', 1" in the flow direction S can also differ from each other. Rib shapes are also conceivable in which there are no pronounced roof surfaces but in which the contact face 6 and downstream face 7 abut each other directly (FIGS. 2b, 2c).

Figure 3A:
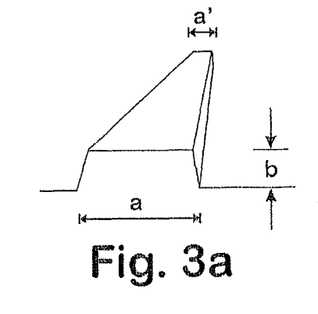
FIGS. 3a-3b various possible shapes of the ribs formed in a surface structure according to the invention in perspective view.
Figure 3B:
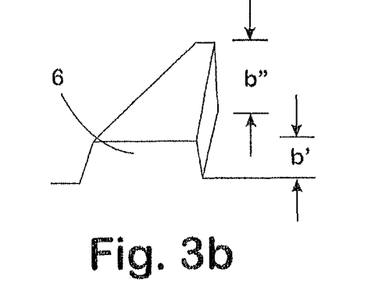

The ribs 1, 1', 1" viewed in the flow direction S can have a constant thickness a. It is also possible to vary the thickness a of the ribs 1, 1', 1" over their length L1, L2. The ribs 1, 1', 1" as shown in FIGS. 3a, 3b, viewed in the flow direction S, can taper starting from a large thickness a in the region of the contact surface 6 to a smaller thickness a' in the region of the downstream surface 7. For this the flanks 2, 3 of the ribs 1 can run towards each other in the direction of the downstream surface 7. Also the height b of the ribs 1, 1', 1" can be constant or vary over the respective length L1, L2 of the ribs 1, 1', 1". Thus the height b in the flow direction S can increase from a small height b' in the region of the contact surface 6 to a large height b" in the region of the downstream surface or vice versa.

In addition it can be favourable if the ribs 1, 1', 1" viewed in the flow direction S describe a curve or have multiple curves.

Figure 4A:
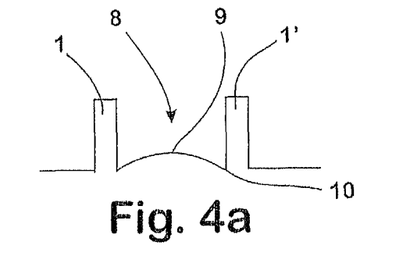
FIGS. 4a-4h various height profiles of groups of a surface structure according to the invention.
Figure 4B:
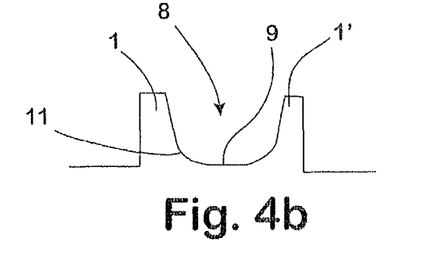
Figure 4C:
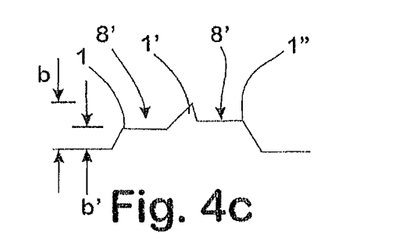
Figure 4D:
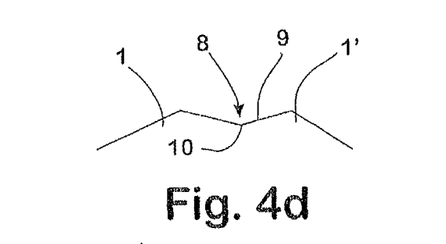
Figure 4E:
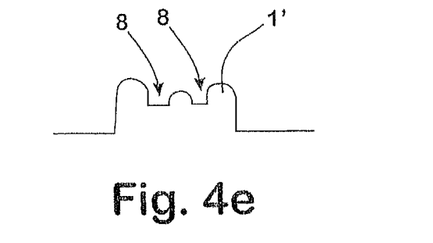
Figure 4F:
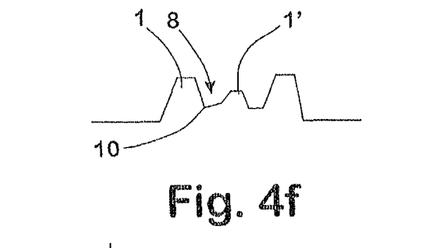
Figure 4G:
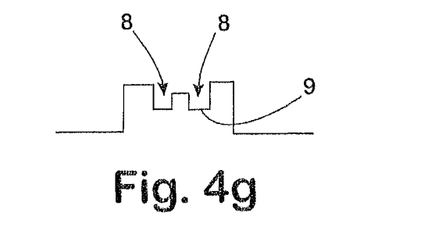
Figure 4H:
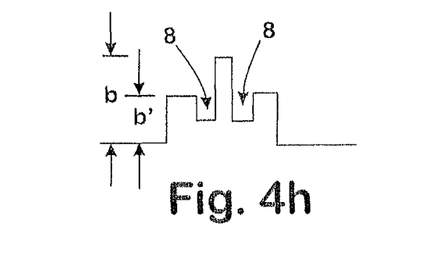

The ribs 1, 1', 1" combined in a group G delimit between them in each case a valley 8, 8', 8" which connects the ribs 1, 1', 1" together. The respective valley 8, 8', 8" can for example have a floor with a convex curve (FIG. 4a), a concave curve (FIG. 4b), a hopper-like cross-section (FIG. 4d) or a flat floor 9 and transform into the adjacent ribs in a sharply defined edge 10 or a continuously curved fluting 11. Also the respective valley 8' can also be formed as a plateau present between two ribs 1, 1', 1" of different height b, b' following each other in the manner of a step (FIG. 4c).

Each group G comprises at least two ribs 1, 1', 1". The ribs 1, 1', 1" of a group can have the same height b (FIGS. 4a, 4b). It can also be suitable if at least one rib 1' of a group G has a height b' differing from the height b of the other groups (FIGS. 4c-4h).

Depending on the size of the respective groups G, G', the distances q, q' of the groups G from each other measured in the transverse direction X to the flow direction S can be in the range from 5 μm to 10 mm. The distances q, q' can be the same for all pairs of adjacent groups G, G' arranged in the transverse direction X or varied. They can follow any arbitrary function to set specific properties locally.

The valleys 12, 12' present between two adjacent groups G, G' can be formed flat or have a height profile differing from a plane. The height profile of the valleys 12, 12' separating the respective groups G, G' differs from the height profile of the valleys 8, 8' which are delimited by the ribs 1, 1' of the groups G, G' which at the same time are adjacent to the valleys 12, 12' separating the groups G, G' from each other.

Figure 5A:
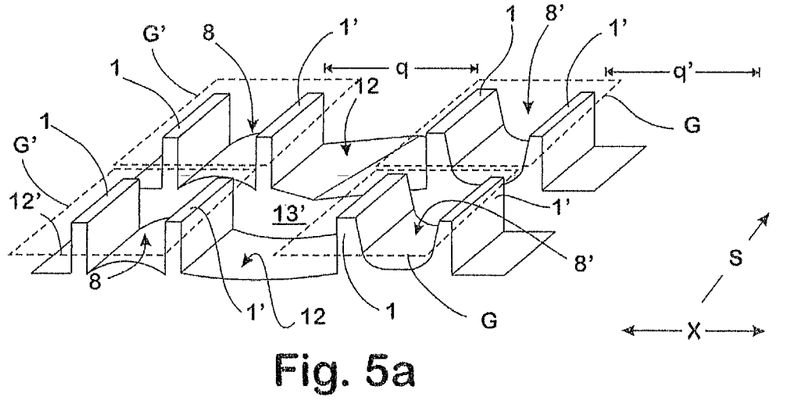
FIGS. 5a-5b various arrangements of groups of a surface structure in perspective view.
Figure 5B:
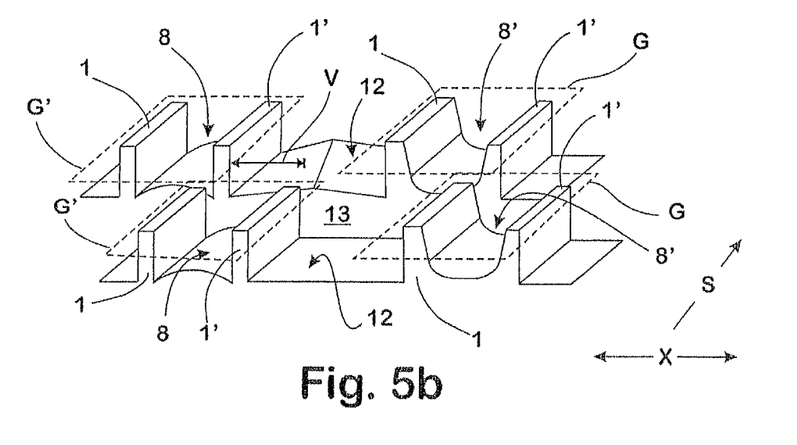

Viewed in the flow direction S, the groups G, G' can be arranged aligned to each other in rows (FIG. 5a) or offset to each other in the transverse direction X (FIG. 5b). In the case of offset arrangement, the offset V need not be the same for all groups G, G' but can also vary to set specific properties locally.

In addition the groups G, G', as also shown in FIGS. 5a, 5b, can be spaced from each other by distance Z in the flow direction S. This need also not be constant but can be different for each pair of groups G, G' adjacent to each other in the flow direction S in order to set specific properties locally. The spacing areas 13, 13' then present between groups G, G' spaced in this direction, like the valleys 12, 12' separating the groups G, G' in the transverse direction X, can be formed flat or otherwise to set specific properties of the surface locally. Depending on the respective local conditions, the valleys 12, 12' and the spacing areas 13, 13' can coincide. This is the case for example if groups G, G' and spacing areas 13, 13' or the valleys 12, 12' separating the groups are arranged alternately in the manner of a chequerboard.

Figure 6A:
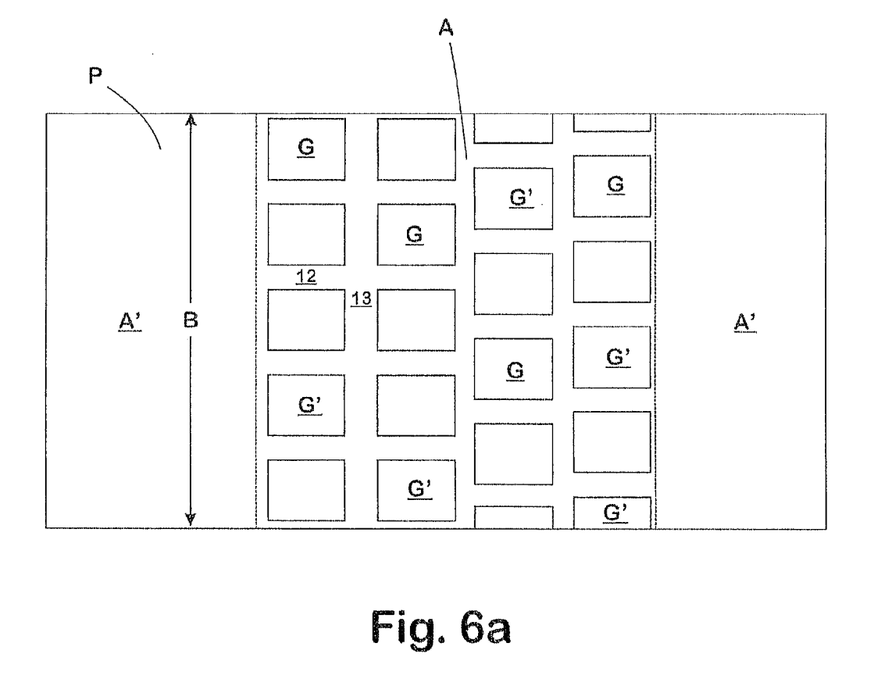
FIGS. 6a-6b various surfaces of the sheet steel products in top view.
Figure 6B:
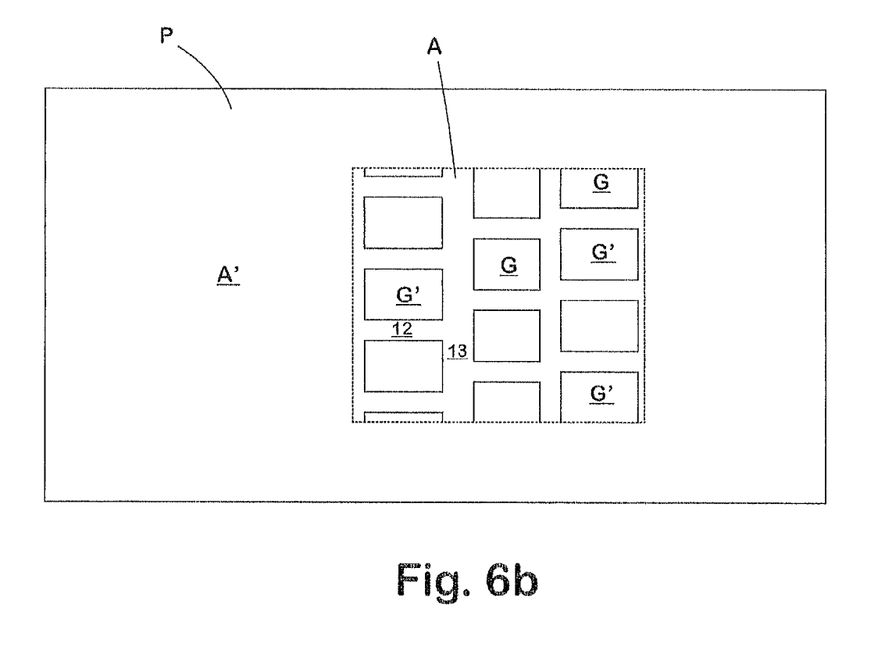
Figure 7:
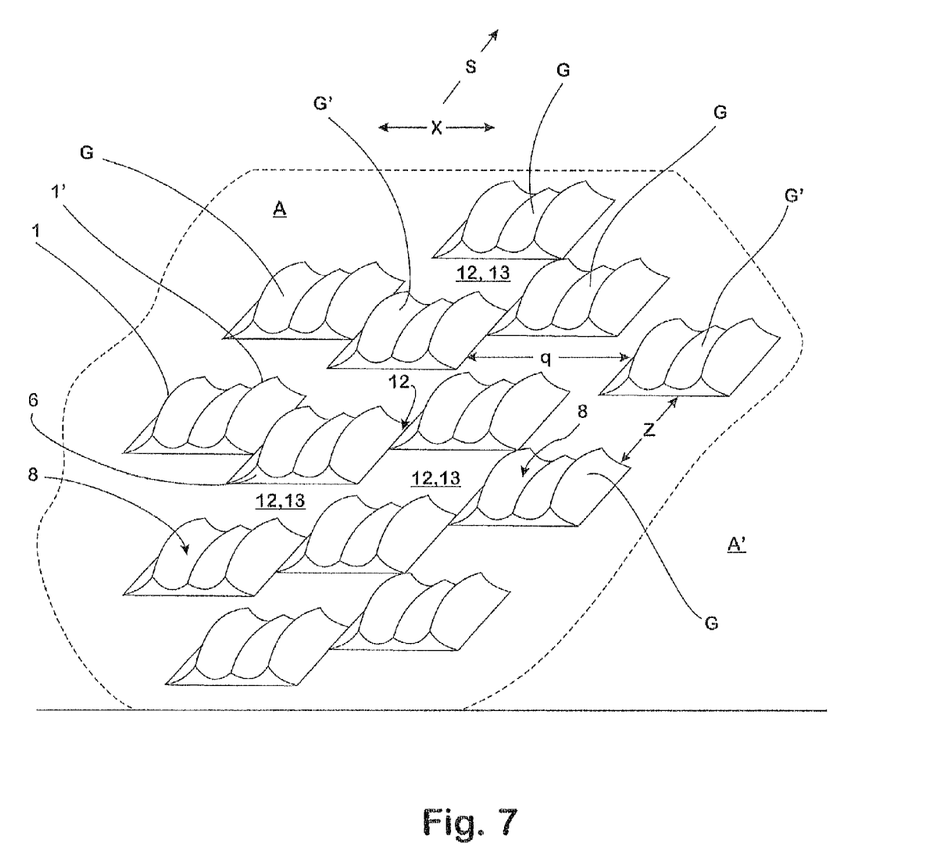
FIG. 7 a surface structure according to the invention in perspective view.

The product P present in the form of a stainless steel sheet can have surface segments A' which are free from groups G, G' and largely formed flat. The segments A of the surface of the product P in which the groups G, G' are located can extend over the entire width B of the product P and each sit between two flat surface segments A' (FIG. 6a) or be arranged isolated in a flat surface segment A' (FIG. 6b).

By the formation of a surface structure according to the invention at specific segments A of the product P, defined properties can be embossed specific to the location. Thus by impressing a surface structure according to the invention, it is possible to set locally or location-specific a particular heat or substance transfer behaviour, a particular pressure loss, a particular friction effect or a particular optical effect, e.g. the emission or absorption coefficient of solar radiation.

The groups G, G' can each comprise subgroups U, U', U" which are arranged relative to each other in the same manner as the groups G, G'. The subgroups U, U', U" of a group G, G' can be positioned behind each other in the flow direction S or next to each other in the transverse direction X. The valleys separating the subgroups U, U', U" adjacent to each other in the transverse direction X can be smooth or flat, i.e. without structure, or have a height profile, the maximum height of which is however smaller than that of the valleys of the adjacent subgroups.

Figure 8A:
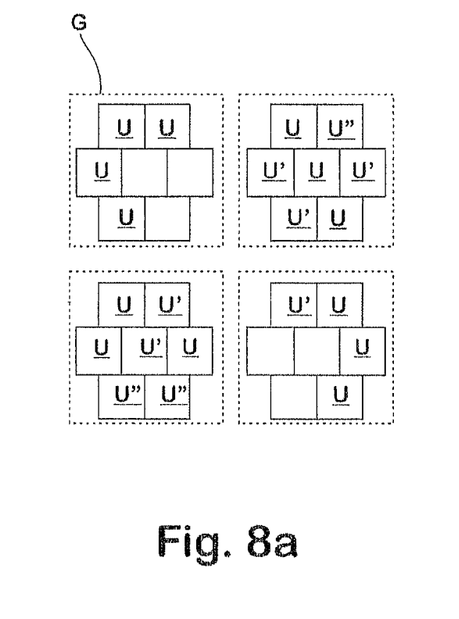
FIGS. 8a-8d each a group comprising various subgroups of a surface structure according to the invention in top view.
Figure 8B:
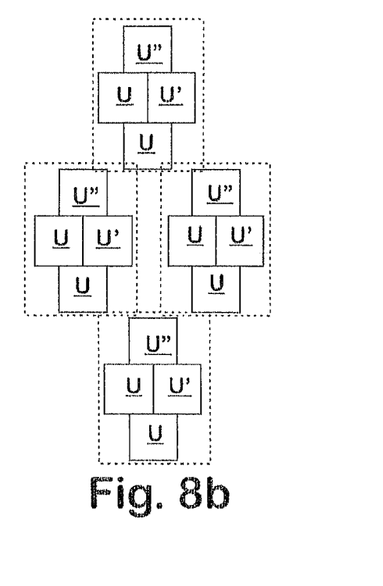
Figure 8C:
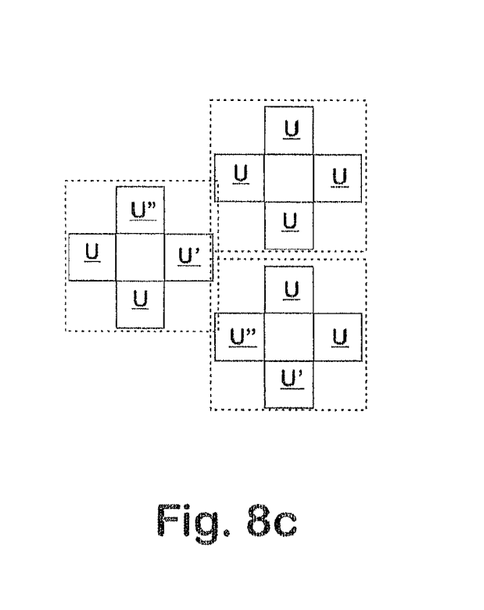
Figure 8D:
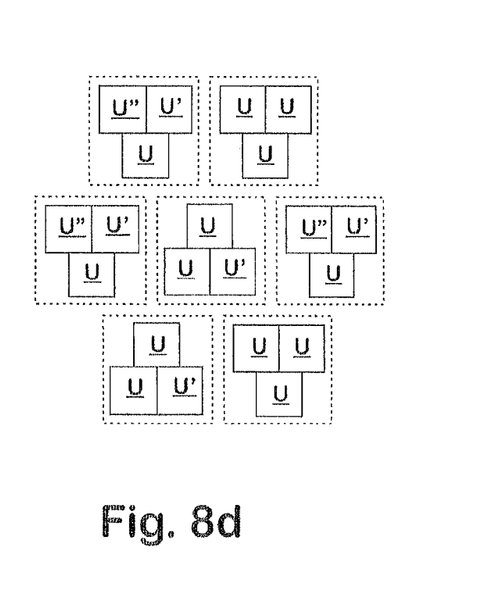

As indicated in FIGS. 8a-8b, a group G, G' can consist of two, three, four, five or more subgroups U, U', U"', wherein each group G, G' has a distance p, p' or Z from the adjacent group G, G' both in the flow direction S and in the transverse direction X. The valleys present between the subgroups U, U', U" (transverse direction X) and the spacing areas (flow direction S), like the valleys 12, 12' separating the groups G, G' in the macrostructure formed by the groups G, G', and the spacing areas 13, 13' can be smooth or have a flat profile which is described by an arbitrary function. Here too however the height profile of the valleys separating the subgroups and the spacing areas present between them where applicable is no higher than that of the ribs of the subgroups.

The subgroups U, U', U" combined into a group G, G' can be formed the same or differently in order to influence locally in a specific manner a particular flow behaviour of the fluid flowing over the surface of the product P.

Figure 9:
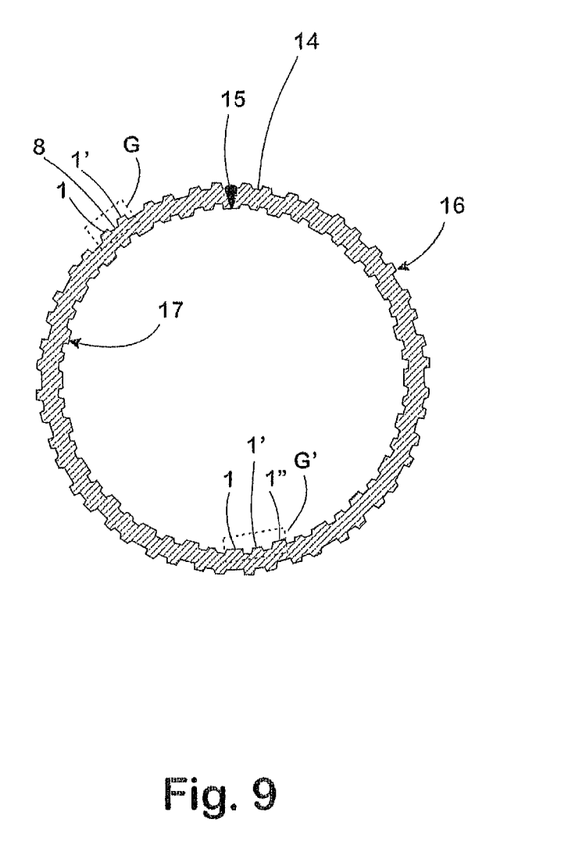
FIG. 9 a pipe for a heat exchanger in a cross-section.

The pipe 14, not shown to scale in FIG. 9 for clarification, for a heat exchanger is made from a cut sheet obtained from a product P which it has been bent in a first production step about a mandrel into a slot profile with circular round cross-section. The joining slot of the slot profile is then closed by a seam 15 by means of laser welding.

Both on its outer face 16 and on its inner face 17, the pipe 14 is provided with a surface structure according to the invention. At the inner faces 17 of the pipe 14 through which flows water or another heat exchanger medium, this surface structure causes a reduced flow resistance with simultaneously optimum heat transmission from the walls of the pipe to the heat exchanger medium. The surface structure formed on the outside of the pipe 14 however creates an optimum heat absorption capacity. In total in this way, using the surface structuring according to the invention, the radiant energy hitting the pipe 14 is absorbed with high efficiency by the pipe 14 and dissipated to the medium flowing through the pipe 14.

The invention claimed is:

1. A product for fluidic applications, comprising at least one surface segment having a plurality of ribs in contact with a fluid flowing in a flow direction, wherein the ribs have a length and a shape, and adjacent ribs delimit between them in each case a valley, wherein in each case at least two ribs with the valley they respectively delimit are combined in a group, and at least two of these groups are present, wherein each group is separated from each group arranged adjacent to it, viewed transverse to the flow direction of the fluid, by a valley, the height profile of the valley separating the respective groups from each other differs in each case from the height profile of the valleys delimited by those ribs of the groups which at the same time are adjacent to the valley separating the groups from each other, the end faces of the ribs against which fluid flows are chamfered or rounded, wherein groups lying behind each other viewed in the flow direction of the fluid are arranged at a distance from each other, wherein a floor of a spacing area present between groups arranged spaced from each other in the flow direction is lower than a floor of the valleys of groups adjacent to the respective spacing area, wherein the groups are arranged offset to each other viewed in the flow direction of the fluid, and wherein at least two ribs of a group have different heights in relation to the floor of the valley separating them from an adjacent group.

2. The product according to claim 1, wherein the valley having a floor separating in each case groups arranged adjacent to each other is lower than the floor of the valleys of the groups adjacent to the valley separating them.

3. The product according to claim 1, wherein groups arranged behind each other viewed in the flow direction of the fluid are positioned offset to each other transverse to the flow direction.

4. The product according to claim 1, wherein groups are arranged behind each other in a row viewed in the flow direction of the fluid.

5. The product according to claim 1, wherein each of the groups comprises at least two subgroups which each comprise at least two ribs and which adjacent ribs delimit a valley, and adjacent subgroups delimit between them in each case a separating valley viewed transverse to the flow direction of the fluid.

6. The product according to claim 5, wherein the height profile of the valley separating the respective subgroups from each other differs in each case from the height profile of the valleys delimited by those ribs of the subgroups which at the same time are adjacent to the valley separating the subgroups from each other.

7. The product according to claim 6, wherein at least two of the subgroups have height profiles differing from each other.

8. The product according to claim 1, wherein more than two groups are present and that at least two groups have a different distance from one of the groups adjacent to them in each case.

9. The product according to claim 1, wherein at the surface coming into contact with the fluid, segments are formed in which groups of ribs and valleys are formed and further comprising at least one segment which is formed flat.

10. The product according to claim 1, wherein it is a flat steel product.

11. A method for producing the product of claim 1, wherein the surface is embossed in a moulding step in a respective segment of the product coming into contact with the fluid.

12. A use of the product of claim 1, for production of pipes which carry a fluid.

* * * * *